(12) United States Patent
Foster

(10) Patent No.: US 7,827,064 B1
(45) Date of Patent: Nov. 2, 2010

(54) DATA PROCESSING SYSTEM FOR PRICING, COSTING AND BILLING OF FINANCIAL TRANSACTIONS

(75) Inventor: Robert A. Foster, Jersey City, NJ (US)

(73) Assignee: Financial Systems Technology (Intellectual Property) Pty. Ltd., Malvern, Victoria (AU)

( * ) Notice: Subject to any disclaimer, the term of this patent is extended or adjusted under 35 U.S.C. 154(b) by 0 days.

(21) Appl. No.: 09/183,335

(22) Filed: Oct. 30, 1998

Related U.S. Application Data

(63) Continuation-in-part of application No. 08/904,716, filed on Aug. 1, 1997, now Pat. No. 6,052,672.

(51) Int. Cl.
*G06Q 20/00* (2006.01)
*G06Q 40/00* (2006.01)

(52) U.S. Cl. .......................................... 705/20; 705/35
(58) Field of Classification Search ................. 705/35
See application file for complete search history.

(56) References Cited

U.S. PATENT DOCUMENTS

| | | | | |
|---|---|---|---|---|
| 4,855,908 | A * | 8/1989 | Shimoda et al. ............. | 364/405 |
| 5,710,887 | A * | 1/1998 | Chelleah et al. ............. | 395/226 |
| 5,878,400 | A * | 3/1999 | Carter ......................... | 705/20 |
| 6,049,782 | A * | 4/2000 | Gottesman et al. ........... | 705/35 |
| 6,052,672 | A * | 4/2000 | Foster ......................... | 705/35 |

OTHER PUBLICATIONS

Evangelos Petroutsos, Mastering Visual Basic 5, 1997, Sybex, Alameda, CA, Chapters 3 and 11.*
Beizer, B., Software Testing Techniques, $2^{nd}$ Edition, International Thompson Computer Press, 1990, p. 1.*
Carrubba, P., Principles of Banking, American Banking Association, 1994, pp. 170-172.*
Parsaye, Kamran & Chignell, Mark. Expert Systems for Experts. John Wiley & Sons. 1988. pp. 35-60, 177-178, 191-210 and 295-309.*
Hendler, James A. Expert Systems: The User Interface. Albex Publishing Corporation. Norwood, NJ. 1988. pp. 31, 46-47, 109-110, 113 and 132-134.*

* cited by examiner

*Primary Examiner*—Jason M Borlinghaus
(74) *Attorney, Agent, or Firm*—Haynes and Boone, LLP; Edward C. Kwok

(57) ABSTRACT

The present invention provides methods and systems for pricing financial transactions by defining product rules, providing links to appropriate price tables, and calculating a price for a financial transaction. A data processing system in accordance with one embodiment of the present invention, creates a product rule corresponding to a financial transaction. The product rule contains mandatory attributes and optional attributes. Optional attributes may be looked up using identifiers constructed from said mandatory attributes. Optional attributes include a link to a price table which contains further attributes, including a pricing method. A price is then calculated in accordance with the pricing method. Billing is completed according to the billing method for the particular financial transaction.

29 Claims, No Drawings

DATA PROCESSING SYSTEM FOR PRICING, COSTING AND BILLING OF FINANCIAL TRANSACTIONS

CROSS REFERENCE TO COPENDING APPLICATION

The present application is a continuation-in-part application to application Ser. No. 08/904,716, entitled "Data Processing System for Complex Pricing and Transactional Analysis" to Robert A. Foster, which was filed on Aug. 1, 1997, issued as U.S. Pat. No. 6,052,672 on Apr. 18, 2000, and assigned to Financial Systems Technology Pty Ltd., which is also the Assignee of the present application.

BACKGROUND OF THE INVENTION

1. Field of the Invention

The present invention relates generally to data processing systems and, in particular, to banking services pricing.

2. Discussion of Related Art

Today, most financial products are commodities and their markets are competitive. New competition can also come from new products, new services, lower prices, the introduction of Real Time Gross Settlement (RTGS), the use of the Internet, mergers, acquisitions, and the shift towards greater reliance on bank fees and charges in place of higher interest margins and in place of cross subsidies between products. Pricing is often a major force in the decision making process for the customers in deciding which financial products or services to use. Therefore, a financial services company (FSC) needs a strategy and an infrastructure to manage its pricing strategies and to manage pricing changes in the most effective way. In many markets, the capability to manage pricing strategies better than the competition can be the competitive advantage.

Furthermore, fee arrangements change in value and structure in response to competitive situations. Fee arrangements can take many shapes, e.g., by product; by time of submission; by specified execution time; by window of time between submission and execution; by transaction value; by pre-assigned payment slots; and/or by some combination of these. In addition, customers are mobile and shop for the best deals. The methods of payment, timings of payment, cash management practices and credit requirements change. Also, competitors pricing strategies change. In response to these changes, FSCs need the ability to calculate pricing accordingly.

Therefore, FSCs not only need to be able to accurately measure the internal economics of the delivery of each product, the margin, the value of the customer relationship overall, and how those measures are changing. The FSCs also need the flexibility to perform relationship pricing by product or across products, taking special arrangements into consideration. In the same time, the FSCs need an infrastructure to keep up with the ever-changing market demands.

SUMMARY

Accordingly, the present invention includes methods and systems for pricing financial transactions by first defining product rules for each financial transaction, locating appropriate product rule for a particular financial transaction, linking the product rule to corresponding price table, calculating a price using the pricing method contained in the price table, and billing the appropriate party using the billing method contained in the price table. A FSC, using embodiments of the present invention, can price a particular financial transaction based on various criteria, including any special deals made and bill it to the appropriate party.

Specifically, a data processing system in accordance with one embodiment of the present invention, creates a product rule corresponding to a financial transaction. The product rule contains various attributes and is linked to a price table which contains further attributes, including pricing method and billing method. A price is calculated in accordance with the pricing method and billing is done in accordance with the billing method.

DETAILED DESCRIPTION

The following includes a detailed description of the best mode or modes presently contemplated by the inventor for carrying out the invention. It is to be understood that these modes are merely exemplary of the invention. The detailed description is not intended to be taken in a limiting sense.

The present invention provides a data processing system which utilizes Product Rules in conjunction with Price Tables to provide a comprehensive set of pricing combinations and to enable sophisticated exception pricing. In the data processing system of the present invention, there are three parts to the pricing function: locating an applicable product rule for a particular financial transaction, looking up the applicable price table, then calculating the appropriate pricing using the pricing method contained in the price table.

A suitable database system for implementing a data processing system in accordance with the present invention is described in a co-pending U.S. application Ser. No. 08/904,716 entitled "DATA PROCESSING SYSTEM FOR COMPLEX PRICING AND TRANSACTIONAL ANALYSIS," which is hereby incorporated by reference in its entirety. However, other database systems can be used to implement a data processing system using the methods of the present invention described herein.

First, Product Rules are defined. Product Rules are usually created for each product. (A financial transaction is denoted as a "product.") Product Rules are also created for all situations needing some form of special or custom pricing. Therefore, it is possible to have different Product Rules created for the same product but for different situations. For example, Product Rules can be created for all products, for all Billable Service Codes (BSC1/2/3/4) of each product, for all Billable Service Codes of each product for each market segment, for all Billable Service Codes of each product for each Balance Allocation Code (BAC), for all Billable Service Codes of each product for each Customer Account Analysis (CAA) group of accounts, for all Billable Service Codes of each product for each account, and for each Billable Service Code. The Product Rules are created and changed from the Product Rule detail screen (PrdtRule Detail screen).

Each Product Rule contains various attributes representing different types of information. Here, each Product Rule contains a number of attributes representing four types of information. The four types of information are: name of the Product Rule, active status of the Product Rule, how pricing and billing is to be performed and display only information about the target entities. The attributes are: Entity Name/Num, Product Code, Apply to Indic, PrdtRule Scope, Record Status, Billing Category, Billing Plan, PRICE Table Name, Special Group, Alternate Account, Alternate Account Type, Feed Indic, Collection Indic, Advising Code, Minimum Revenue Indic, Derived Volume On, Subscription Volume, Billing Cycle and Run.

The name of the Product Rule forms a unique identifier for each Product Rule. The name is constructed of four main attributes which explain when a Product Rule is used. The four mandatory attributes are Entity Name/Num, Product Code, Apply to Indic, and PrdtRule Scope. Entity Name/Num provides information such as a customer number for a customer, an account number for an account, or a service code for a particular service. Product Code provides information as to what type of financial transaction is being done. Apply to Indic provides information as to what the Product Rule actually applies to, e.g. account or service. PrdtRule Scope provides refined details on the scope of the Product Rule. Of course, other attributes or combination may be used to form the name.

Examples will be used to illustrate how the naming convention using the four attributes named above applies.

|   | Entity Name/Num | Product Code | Apply to Indic | PrdtRule Scope |
|---|---|---|---|---|
| 1 | PBB | PBB | PRDT | DFLT |
| 2 | 35 | 35 | PRDT | DFLT |
| 3 | _____-_____CNTL | 35 | ACMK | DFLT |
| 4 | 12345678900-01DDA | 35 | ACNT | DFLT |
| 5 | 12345678900-01DDA | 35 | ACNT | 1234567 |
| 6 | 1234567 | 35 | SVC | DFLT |

The first Product Rule "PBB-PBB-PRDT-DFLT" is the highest level of default and is activated when pricing is performed on BSC1/2/3/4 Billable Service Codes for a product which does not have a Product Rule. For example, if there are only 2 Product Rules (PBB-PBB-PRDT-DFLT and 35-35-PRDT-DFLT), then the first Product Rule "PBB-PBB-PRDT-DFLT" would be used for pricing, costing and billing of, for example, product 27.

The second Product Rule "35-35-PRDT-DFLT" is activated when pricing is performed on BSC1/2/3/4 Billable Service Codes for product 35.

The third Product Rule "_____-_____CNTL-35-ACMK DFLT" is activated when pricing is performed on BSC1/2/3/4 Billable Service Codes for product 35 but only for accounts with account numbers which match the account wild card mask "_____-_____CNTL".

The fourth Product Rule "12345678900-01DDA-35-ACNT-DFLT" is activated when pricing is performed on BSC1/2/3/4 Billable Service Codes for product 35 but only for account number 12345678900-01DDA.

The fifth Product Rule "12345678900-01DDA-35-ACNT-1234567" is activated when pricing is performed specifically on BSC1/2/3/4 Billable Service Code 1234567 for product 35 but only for account number 12345678900-01DDA. For services other than 1234567, the fourth Product Rule is activated.

The sixth Product Rule is activated when pricing is performed specifically on BSC1/2/3/4 Billable Service Code 1234567 for product 35 for all accounts.

A Search Key is constructed from Entity Name/Num, Product Code, Apply to Indic, and PrdtRule Scope, and may be displayed on the screen. The Search Key is the connection to locating the applicable Price Table. The Search Key is also used as an aid to check the Name which the data processing system has constructed for the Product Rule. Because the Search Key is generally used for technical purposes only, it may be ignored by users when used for this purpose.

Active status of the Product Rule contains information about the record status of the Product Rule. The record status can be either active or dormant. A dormant state means that a Product Rule has been set up for future activation. For example, a special deal has been negotiated but will not take effect until some later date. Product Rules relating to that special deal can be created immediately but placed in a dormant mode. The data processing system will then ignored these Product Rules until they are activated on the date when the deal goes into effect. This attribute provides the flexibility of activating or deactivation a Product Rule and allows the Product Rule to remain in the data processing system while not in use.

Information about how pricing and billing is to be performed contains attributes that gives significant information on how the price is used. The information about how pricing and billing is to be performed includes information used by the data processing system to find the applicable Price Table containing prices or costs. For example, information about how pricing and billing is to be performed can include attributes such as Billing Category, Billing plan, Price Tbl Name, Special Group, Alternate Account, Alternate Account Type, Feed Indicator, Collection Indicator, Advising Code, Minimum Revenue Indicator, Derived Volume On, Subscription Volume, Billing Cycle, and Run Driver.

Display only information about the target entities is a one-liner display on the screen that displays the applicable target entities which are referred to by the Product Rule. This information may include attributes such as Ac/BAC/Sv/Mk/Prd, Price Table detail, and alternate account.

The Product Rule attributes will be described in further details in the following paragraphs.

Entity Name/Num is a mandatory attribute and can be any of the following: an account wild card mask containing any mixture of alphabetic characters, numbers, a hyphen "-", wild card characters of underscore "" (equals any single character) and a single percentage "%" (equals any zero or more characters) which can only be used as the last non blank character, an existing account number, an existing BAC, an existing CAA main account number, an existing market segment, an existing product code, or an existing BSC1/2/3/4 Billable Service Code.

When Apply to Indic is not "ACMK", the Entity Name/Num value is an identifier of an entity which exists on the database. When Apply to Indic is "ACMK", the account wild card mask can include any mixture of alphabetic characters, numbers, a hyphen "-", and wild card characters of underscore "" and a single percentage "%" which can only be used as the last non blank character.

Product Code is another mandatory attribute. Product Codes answer the question as to which service or product is being used. Product Codes are required in the database and may be supplied "out of the box". For example, a Product Code of "35" is a code from Treasury Management Association (TMA) Product Families and indicates the service requested is a wire transfer transaction.

A Product Rule should be set-up for each Product the data processing system will price and cost and these Product Rules will be shown by Apply to Indic as "PRDT". A Product Rule using "PBB" as a product code provides the data processing system with a default Product Rule named "PBB-PBB-PRDT-DFLT."

Apply to Indic is a third mandatory attribute. The value of Apply to Indic indicates the type of entity which Entity Name/Num refers to. For example, an indicator may indicate that a particular Product Rule applies only to a particular account, service or customer wire transfer.

Validation rules are applied at the time of creation to check the validity of the indicator with respect to Entity Name/Num. The following table illustrates the validation rules for each Apply to Indic value.

| Apply to Indic | Validation performed for Entity Name/Num |
| --- | --- |
| ACMK | An account wild card mask can use the following characters: any alphabetic characters, any numbers, a hyphen "-", any number of underscore characters "_" which represents any single character, "%" represents any zero or more characters. ("%" can appear only once in the account wild card mask and must be the last non-blank character in the account wild card mask.) |
| ACNT | Entity Name/Num must be an existing account number. |
| BAC | Entity Name/Num must be an existing BAC. |
| CAA | Entity Name/Num must be an existing CAA main account number. |
| MKT | Entity Name/Num must be an existing market segment. |
| PRDT | Entity Name/Num must be an existing product. |
| SVC | Entity Name/Num must be an existing BSC1/2/3/4 Billable Service Code. |

A Product Rule can exist for a CAA main account which covers all accounts in the CAA account grouping. An additional Product Rule can also exist just for the CAA main account so that this account can have exception pricing. There are some special situations when Apply To Indic is "MKT", meaning market segment, and the Entity Name/Num is a CAA.

For CAA individual accounts, the data processing system first attempts to find the account's market segment. If the market segment for the individual account is missing, the data processing system then attempts to find the market segment of the account's BAC.

For CAA main accounts, the data processing system first attempts to find the account's market segment, and if the account's market segment is missing, the data processing system then attempts to find the market segment of the account's BAC.

For CAA subordinate accounts, the data processing system first attempts to find the account's market segment. If the account's market segment is missing, the data processing system then attempts to find the market segment of the account's BAC. If the market segment of the account's BAC is also missing, the data processing system then attempts to find the market segment of the CAA main account. If the market segment of the CAA main account is still missing, the data processing system then attempts to find the market segment of the CAA main account's BAC.

PrdtRule Scope is another mandatory attribute. PrdtRule Scope contains refined details on the scope of a particular Product Rule by defining how a Product Rule is applicable to a product's BSC1/2/3/4 Billable Service Codes. The possible entries are "DFLT", "*" or a BSC1/2/3/4 Billable Service Code. "DFLT" means the Product Rule is applicable to all of the product's BSC1/2/3/4 Billable Service Codes. Entity Name/Num values which are account wild card masks require PrdtRule Scope to be "DFLT". "*" means the Product Rule is applicable only to BSC1/2/3/4 Billable Service Codes which have a unit price in the Price Table, i.e., Price Method (Mth 1) of "U". Any other value is deemed to be a BSC1/2/3/4 Billable Service Code, meaning that the Product Rule is applicable to that particular BSC1/2/3/4 Billable Service Code only. When Subscription Volume is not blank, the BSC1/2/3/4 Billable Service Code specified in PrdtRule Scope must use a Service Role of "SUBS" on the Service Details screen.

Record Status is an optional field. Record Status displays the status of the record. Record Status value can be blank, "++" meaning a relationship is missing, "00" meaning the record is closed, "01" meaning the record is open, or "11" meaning the record is dormant.

Billing Category is an optional field. Billing Category contains information of which set of Billable Service Codes (BSC1 or BSC2 or BSC3 or BSC4) to use to bill a particular customer. When a pricing is to be performed, the data processing system uses the Product Rules to find the applicable Billing Category. The value for Billing Category can be blank, BSC1, BSC2, BSC3 or BSC4. BSC1, BSC2, BSC3 and BSC4 are billing categories provided "out-of-the-box". The data processing system performs Product Rule lookups until a non-blank Billing Category is found. Billing Category is always based on a CAA individual account or on a CAA main account. In the case of a CAA subordinate account, the Billing Category is based on its CAA main account.

Following table shows a hierarchy of how the data processing system performs Billing Category lookups.

| Step | Entity Name/Num | Product Code | Apply To Indic | PrdtRule Scope | Billing Category |
| --- | --- | --- | --- | --- | --- |
| 1 | ___-___CNTL | The product code | ACMK | DFLT | BSC2 |
| 2 | The CAA individual or CAA main account | The product code | CAA | DFLT | ? |
| 3 | The CAA individual or CAA main account | The product code | ACNT | DFLT | ? |
| 4 | The BAC code | The product code | BAC | DFLT | ? |
| 5 | The product code | The product code | PRDT | DFLT | BSC1 |
| 6 | PBB | PBB | PRDT | DFLT | BSC1 |

"?" means the Product Rule's Billing Category. If the Product Rule's Billing Category is blank, there is no Billing Category applicable for this Product Rule and the data processing system continues to look by executing the next step until one is found.

Assume the data processing system needs to find the Billing Category for CAA subordinate account "11111111111-01DDA". Further assume that the product code is "35"; account is the CAA main account "222222222222-01 DDA"; and the CAA main account belongs to BAC "0712301". The sequence of Product Rule lookups is performed as illustrated in the following example.

| Step | Entity Name/Num | Product Code | Apply To Indic | PrdtRule Scope | Billing Category |
| --- | --- | --- | --- | --- | --- |
| 1 | ___-___CNTL | 35 | ACMK | DFLT | BSC2 |
| 2 | 222222222222-01DDA | 35 | CAA | DFLT | ? |
| 3 | 222222222222-01DDA | 35 | ACNT | DFLT | ? |

-continued

| Step | Entity Name/Num | Product Code | Apply To Indic | PrdtRule Scope | Billing Category |
|------|-----------------|--------------|----------------|----------------|------------------|
| 4 | 0712301 | 35 | BAC | DFLT | ? |
| 5 | 35 | 35 | PRDT | DFLT | BSC1 |
| 6 | PBB | PBB | PRDT | DFLT | BSC1 |

In the above example, step 6 never executes because the Product Rule lookups stop at step 5, after finding "BSC1".

Billing Plan is an optional field. Billing Plan contains information of whether the customer is billed using compensating balance method or using fee-based method or using services rendered. Service rendered is for cost only which is used to handle inter office allocations. When billing is to be performed, the data processing system uses the Product Rules to find the applicable Billing Plan. The data processing system performs Product Rule lookups until a non-blank Billing Plan is found. The lookups do not use CAA roles. Therefore, the data processing system is not interested in whether an account is a CAA individual account or a CAA main account or a CAA subordinate account.

The following table illustrates the hierarchy for Product Rules lookups for Billing Plan.

| Step | Entity Name/Num | Product Code | Apply To Indic | PrdtRule Scope | Billing Plan |
|------|-----------------|--------------|----------------|----------------|--------------|
| 1 | ___-___CNTL | The product code | ACMK | DFLT | SERV |
| 2 | The BSC1/2/3/4 Billable Service Code | The product code | SVC | The BSC1/2/3/4 Billable Service Code | ? |
| 3 | The account number | The product code | ACNT | The BSC1/2/3/4 Billable Service Code | ? |
| 4 | The account number | The product code | ACNT | DFLT | ? |
| 5 | The BAC code | The product code | BAC | DFLT | ? |
| 6 | The product code | The product code | PRDT | DFLT | COMP |
| 7 | PBB | PBB | PRDT | DFLT | FEE |

"?" means the Product Rule's Billing Plan. Billing Plan may contain the following value: blank, "COMP", "FEE", or "SERV". If Billing Plan is blank, there is no Billing Plan applicable for this Product Rule and the data processing system continues to look by executing the next step. If Billing Plan is "COMP", compensating balance is used. If Billing Plan is "FEE", pricing is fee based. If Billing Plan is "SERV", a service has been rendered and will be billed as cost only. Note that only costing is performed when the Product Rule's Billing Plan is "SERV".

When the Product Detail attribute multiple billing plans (Multiple BP's) has a value of "N", the product does not use multiple Billing Plans and the Product Rule lookup starts at step 6.

Assume the data processing system needs to find the Billing Plan for account "11111111111-01DDA". Further assume the BSC1/2/3/4 Billable Service Code is "12345678" for product "10" and the account belongs to BAC "0712301". The sequence of Product Rule lookups is performed according to the following example.

| Step | Entity Name/Num | Product Code | Apply To Indic | PrdtRule Scope | Billing Plan |
|------|-----------------|--------------|----------------|----------------|--------------|
| 1 | ___-___CNTL | 10 | ACMK | DFLT | SERV |
| 2 | 12345678 | 10 | SVC | 12345678 | ? |
| 3 | 11111111111-01DDA | 10 | ACNT | 12345678 | ? |
| 4 | 11111111111-01DDA | 10 | ACNT | DFLT | ? |
| 5 | 0712301 | 10 | BAC | DFLT | ? |
| 6 | 10 | 10 | PRDT | DFLT | COMP |
| 7 | PBB | PBB | PRDT | DFLT | FEE |

In the above example, step 7 never executes for product 10 because the Product Rule lookups stop at step 6, after finding "COMP".

PRICE Tbl Name is an optional field. A Product Rule refers to a Price Table using its PRICE Tbl Name field. PRICE Tbl Name may contain a value of blank, any four-character combination, or "AUTO".

When PRICE Tbl Name is a four-character field, e.g. not blank and not "AUTO", the value must be the name of an existing Price Table. For example, if PRICE Tbl Name is "PB01", this Product Rule uses the Price Table named "PB01" for its prices. If PRICE Tbl Name is "PB24", this Product Rule uses the Price Table named "PB24" for its prices.

When there are few exception pricing situations, four-character Price Table names are adequate and simple to manage. However, when there are hundreds or even thousands of exception pricing situations, a more obvious and apparent method of naming is needed for users to be able to see where a current Price Table fits, which Product Rule it belongs to and the boundaries of its jurisdiction. In these cases, the Price Table name can be set to match the Product Rule name by using the value "AUTO" in the Product Rule's PRICE Tbl Name field. For example, if PRICE Tbl Name is "AUTO", this Product Rule uses the Price Table which matches its identifier made up of the four attributes: Entity Name/Num+Product Code+Apply to Indic+PrdtRule Scope. "AUTO", therefore, is a special name. "AUTO" can only be used when Apply to Indic is "ACNT" or "CAA", and when Pricing Schema of the Price Table is "PRIC".

If PRICE Tbl Name is blank in a Product Rule, it means that this Product Rule does not get used for prices but can get used for its remaining features. Many Product Rules and many price Tables can be involved in a single pricing. However, a Price Table is only used if a Product Rule refers to it. Therefore, Price Tables which are not referred to by Product Rules are never used in pricing, i.e., they are dormant.

When a pricing is to be performed, the data processing system needs to be able to find the applicable Product Rules and Price Tables so that a price and cost can be calculated for a BSC1/2/3/4 Billable Service Code. The data processing system performs Product Rule lookups until a non-blank PRICE Tbl Name is found.

The following example shows how a Product Rule's PRICE Tbl Name is used to match with the Price Table's Entity Name/Num. If the values of the PRICE Tbl Name and Entity Name/Num are the same, the PRICE Tbl Name and Entity Name/Num match.

Product Rule:

| Entity Name/Num | Product Code | Apply to Indic | PrdtRule Scope | PRICE_Tbl Name |
|---|---|---|---|---|
| 1234567 | 35 | SVC | DFLT | PB01 |
| _____-___CNTL | 35 | ACMK | DFLT | PB24 |

Price Table:

| Entity Name/Num | Product Code | Apply to Indic | PrdtRule Scope |
|---|---|---|---|
| PB01 | 35 | blank | blank |
| PB24 | 35 | blank | blank |

The following example shows how a Product Rule's PRICE Tbl Name of "AUTO" is used to match with Product Rule's identifier with a Price Table's identifier.

Product Rule:

| Entity Name/Num | Product Code | Apply to Indic | PrdtRule Scope | PRICE_Tbl Name |
|---|---|---|---|---|
| 12345678900-01DDA | 35 | ACNT | DFLT | AUTO |
| 12345678900-01DDA | 35 | ACNT | 1234567 | AUTO |

Price Table:

| Entity Name/Num | Product Code | Apply to Indic | PrdtRule Scope |
|---|---|---|---|
| 12345678900-01DDA | 35 | ACNT | DFLT |
| 12345678900-01DDA | 35 | ACNT | 1234567 |

The sequence and hierarchy of Product Rule lookups for PRICE Tbl Name is as follows:

| Step | Entity Name/Num | Product Code | Apply To Indic | PrdtRule Scope | PRICE Tbl_Name |
|---|---|---|---|---|---|
| 1 | _____-___CNTL | The product code | ACMK | DFLT | C001 |
| 2 | The applicable BSC1/2/3/4 Billable Service Code | The product code | SVC | The BSC1/2/3/4 Billable Service Code | ? |
| 3 | The CAA individual or CAA subordinate account | The product code | ACNT | The BSC1/2/3/4 Billable Service Code | ? |
| 4 | The CAA individual or CAA subordinate account | The product code | ACNT | * | ? |
| 5 | The CAA individual or CAA main account | The product code | CAA | The BSC1/2/3/4 Billable Service Code | ? |
| 6 | The CAA individual or CAA main account | The product code | CAA | * | ? |
| 7 | The CAA individual or CAA subordinate account | The product code | ACNT | DFLT | ? |
| 8 | The CAA individual or CAA main account | The product code | CAA | DFLT | ? |
| 9 | The BAC of the CAA individual or CAA main account | The product code | BAC | DFLT | ? |
| 10 | The market segment of the account | The product code | MKT | DFLT | ? |
| 11 | The product code of the BSC1/2/3/4 Billable Service Code | The product code | PRDT | DFLT | S001 |
| 12 | PBB | PBB | PRDT | DFLT | S001 |

"The CAA individual or CAA subordinate account" means the account's CAA Role is either "INDIV" or "SUB". "The CAA individual or CAA main account" means the account's CAA Role is either "INDIV" or "MAIN". In the case of a CAA subordinate account, its CAA main account number is used.

"The market segment of the account" means that for CAA individual accounts, the data processing system first attempts to find the account's market segment. If CAA individual account's market segment is missing, the data processing system then attempts to find the market segment of the account's BAC.

For CAA main accounts, the data processing system first attempts to find the account's market segment. If the account's market segment is missing, the data processing system then attempts to find the market segment of the account's BAC.

For CAA subordinate accounts, the data processing system first attempts to find the account's market segment. If the account's market segment is missing, the data processing system then attempts to find the market segment of the account's BAC. If the market segment of the account's BAC is also missing, the data processing system then attempts to find the market segment of the CAA main account. If the market segment of the CAA main account is still missing, the data processing system then attempts to find the market segment of the CAA main account's BAC.

"?" means the Product Rule's PRICE Tbl Name. If "?" is blank, there is no Price Table applicable for this Product Rule. If "?" is "AUTO", the data processing system constructs the identifier of the Price Table. If the Price Table with the constructed identifier does not exist, there is no Price Table applicable for this Product Rule. If "?" contains any other value, this value is the identifier of the Price Table. "C001" is a Price Table provided "out of the box" and contains sample costs. "S001" is a Price Table provided "out of the box" and contains sample prices.

"*" in PrdtRule Scope means if the BSC1/2/3/4 Billable Service Code actually has a unit price in the Price Table, i.e., Price Method (Mth 1) of "U".

Assume the data processing system is performing a pricing for BSC1/2/3/4 billable Service Code "12345678". Further assume the account is "11111111111-01DDA"; BSC1/2/3/4 Billable Service Code "12345678" belongs to product code "35"; account '11111111111-01DDA' is a CAA subordinate account and its CAA main account is "222222222222-01DDA"; the CAA main account belongs to BAC "0712301"; and the CAA main account belongs to market segment "OTHER". The sequence of Product Rule lookups is performed as illustrated in the following examples, until a non-blank PRICE Tbl Name is found.

| Step | Entity Name/Num | Product Code | Apply To Indic | PrdtRule Scope | PRICE_Tbl Name |
|---|---|---|---|---|---|
| 1 | ___-___CNTL | 35 | ACMK | DFLT | C001 |
| 2 | 12345678 | 35 | SVC | 12345678 | ? |
| 3 | 11111111111-01DDA | 35 | ACNT | 12345678 | ? |
| 4 | 11111111111-01DDA | 35 | ACNT | * | ? |
| 5 | 222222222222-01DDA | 35 | CAA | 12345678 | ? |
| 6 | 222222222222-01DDA | 35 | CAA | * | ? |
| 7 | 11111111111-01DDA | 35 | ACNT | DFLT | ? |
| 8 | 222222222222-01DDA | 35 | CAA | DFLT | ? |
| 9 | 0712301 | 35 | BAC | DFLT | ? |
| 10 | OTHER | 35 | MKT | DFLT | ? |
| 11 | 35 | 35 | PRDT | DFLT | S001 |
| 12 | PBB | PBB | PRDT | DFLT | S001 |

Special Group is an optional field. Special Group can be blank, "Y" or "N". This attribute can only be "Y" if Price Table has a four-character name (not "AUTO") and the schema of the price table is "BNDL".

Alternate Account is an optional field. When billing is to be performed, the data processing system uses the Product Rules to find Alternate Accounts. The data processing system performs Product Rule lookups to find whether there is an applicable Alternate Account. If there is an Alternate Account, even if a match has been found, a different account may be billed instead. Alternate Account may have a value of blank or an account number.

When Alternate Account is blank, there is no Alternate Account applicable for this Product Rule and the data processing system continues to look by executing the next step. When Alternate Account is non-blank, the value must be an account which exists on the database and Alternate Account Type must be either "C" when the Apply To Indic is "SVC" or "F" when the Apply To Indic is "ACNT".

In the first example, assume the data processing system needs to find whether there is an Alternate Account for "11111111777-01DDA". Further assume that BSC1/2/3/4 Billable Service Code "ABC050" which belongs to product "05", is being used. Then, the Product Rules lookup stops at step 2 after finding an Alternate Account for the BCS1/2/3/4 Billable Service Code.

| Step | Entity Name/Num | Product Code | Apply To Indic | PrdtRule Scope | Alternate Account | Alternate Account Type |
|---|---|---|---|---|---|---|
| 1 | 11111111777-01DDA | 05 | ACNT | DFLT | blank | blank |
| 2 | ABC050 | 05 | SVC | ABC050 | 010091111 1111-01CNTL | C |

Using slightly different Product Rules, the Product Rules lookup in the next example stops at step 1 after finding an Alternate Account for the Entity Name/Num.

| Step | Entity Name/Num | Product Code | Apply To Indic | PrdtRule Scope | Alternate Account | Alternate Account Type |
|---|---|---|---|---|---|---|
| 1 | 11111111777-01DDA | 05 | ACNT | DFLT | 11114567888-01DDA | F |
| 2 | ABC050 | 05 | SVC | ABC050 | 010091111 1111-01CNTL | C |

Using slightly different Product Rules in this example, the Product Rules lookup stops at step 2 having found no applicable Alternate Account.

| Step | Entity Name/Num | Product Code | Apply To Indic | PrdtRule Scope | Alternate Account | Alternate Account Type |
|---|---|---|---|---|---|---|
| 1 | 11111111777-01DDA | 05 | ACNT | DFLT | blank | blank |
| 2 | ABC050 | 05 | SVC | ABC050 | blank | blank |

Alternate Acnt Type is an optional field. Alternate Acnt Type has a value of blank, "F" or "C". When Alternate Account is non-blank, Alternate Account Type must be either "C" when the Apply To Indic is "SVC" or "F" when the Apply To Indic is "ACNT". "C" means the BSC1/2/3/4 Billable Service Code is a cost only service to the BAC. The BSC1/2/3/4 Billable Service Code is allocated to a control account whenever this BSC1/2/3/4 Billable Service Code is used. "F" means the BSC1/2/3/4 Billable Service Codes for this account will be allocated to the Alternate Account.

Product Rule lookups for Alternate Account Type are similar to that discussed above for Alternate Account.

Fee Indicator is an optional field and is dormant.

Collection Indicator is an optional field. When billing is to be performed, the data processing system uses the Product Rules to find the applicable Collection Indicator. The data processing system performs Product Rule lookups until a non-blank Collection Indicator is found. The lookups do not use CAA roles. Therefore, the lookups are not interested in whether an account is a CAA individual account or a CAA main account or a CAA subordinate account.

The sequence and hierarchy of Product Rule lookups for Collection Indicator is as follows:

| Step | Entity Name/Num | Product Code | Apply To Indic | PrdtRule Scope | Collection Indic |
|------|-----------------|--------------|----------------|----------------|------------------|
| 1 | -___NOS % | The product code | ACMK | DFLT | OTHR |
| 2 | The account number | The product code | ACNT | The BSC1/2/3/4 Billable Service Code | ? |
| 3 | The BSC1/2/3/4 Billable Service Code | The product code | SVC | The BSC1/2/3/4 Billable Service Code | APP1 |
| 4 | The account number | The product code | ACNT | DFLT | ? |
| 5 | The product code | The product code | PRDT | DFLT | APP2 |
| 6 | PBB | PBB | PRDT | DFLT | APP2 |

"?" means the Product Rule's Collection Indicator. If "?" is blank, there is no Collection Indicator applicable for this Product Rule and the data processing system continues to look by executing the next step. Collection Indicator values may be: Blank, "APP1", "APP2", or "OTHR".

Assume the data processing system needs to finds the Billing Category for account "11111111111-01SAV". Further assume that the BSC1/2/3/4 Billable Service Code is "12345678" for product "10". The sequence of Product Rule lookups is performed as illustrated in the following examples, until a non-blank Collection Indicator is found.

| Step | Entity Name/Num | Product Code | Apply To Indic | PrdtRule Scope | Collection Indic |
|------|-----------------|--------------|----------------|----------------|------------------|
| 1 | -___NOS % | 10 | ACMK | DFLT | OTHR |
| 2 | 11111111111-01SAV | 10 | ACNT | 12345678 | ? |
| 3 | 12345678 | 10 | SVC | 12345678 | APP1 |
| 4 | 11111111111-01SAV | 10 | ACNT | DFLT | ? |
| 5 | 10 | 10 | PRDT | DFLT | APP2 |
| 6 | PBB | PBB | PRDT | DFLT | APP2 |

In the above example, step 6 does not execute because the Product Rule lookups stops at step 5, after finding "APP2".

Advising Code is an optional field. When billing is to be performed, the data processing system uses the Product Rules to find the Advising Code. The data processing system performs Product Rule lookups to find whether there is an applicable Advising Code.

Advising Code may have a value of blank, "1", "2", "3", "4", or "5". When Advising Code is blank, there is no Advising Code applicable for this Product Rule. "1" means balance based but with no statement. "2" means balance based by statement. "3" means fee based but with no statement. "4" means fee based by statement. "5" means fee based by invoice.

Assume the data processing system needs to find whether there is an Advising Code for product "05" for account "11111111777-01DDA". Using sample values for Advising Code, the Product Rules lookup would find that there is no applicable Advising Code in the first entry and the Advising Code is "1" in the second entry.

| Entity Name/Num | Product Code | Apply To Indic | PrdtRule Scope | Advising Code |
|-----------------|--------------|----------------|----------------|---------------|
| 11111111777-01DDA | 05 | ACNT | DFLT | blank |
| 11111111777-01DDA | 05 | ACNT | DFLT | 1 |

Minimum Revenue Indicator is an optional field. When pricing is to be performed, the data processing system uses the Product Rules to find the applicable Minimum Revenue Indicator. The data processing system performs Product Rule lookups until a non-blank Minimum Revenue Indicator is found. The lookups use CAA roles. Hence, when an account has the CAA Role of CAA subordinate account, they may use its CAA main account during the lookup.

The sequence and hierarchy of Product Rule lookups is as follows:

| Step | Entity Name/Num | Product Code | Apply To Indic | PrdtRule Scope | Minimum Revenue Indicator |
|------|-----------------|--------------|----------------|----------------|---------------------------|
| 1 | The account number | The product code | ACNT | The BSC1/2/3/4 Billable Service Code | ? |
| 2 | The account number | The product code | ACNT | * | ? |
| 3 | The account number | The product code | ACNT | DFLT | ? |
| 4 | The CAA main account number | The product code | CAA | The BSC1/2/3/4 Billable Service Code | ? |
| 5 | The CAA main account number | The product code | CAA | * | ? |
| 6 | The CAA main account number | The product code | CAA | DFLT | A |

"?" means the Product Rule's Minimum Revenue Indicator and may be blank, "A" or "V". If "?" is blank, there is no Collection Indicator applicable for this Product Rule and the data processing system continues to look by executing the next step. "A" indicates to always apply minimum even if no activity occurred for the BSC1/2/3/4 Billable Service Code. "V" means to only apply minimum when activity occurred for the BSC1/2/3/4 Billable Service Code.

When the account uses a CAA Role of a CAA Individual Account, only steps 1, 2 and 3 are applicable. When the account uses a CAA Role of a CAA Main Account, all the steps are applicable. When the account uses a CAA Role of a CAA Subordinate Account, steps 1, 2 and 3 use the account number of the CAA Subordinate Account; and steps 4, 5 and 6 use the account number of its CAA Main Account.

For the next example, assume the data processing system needs to find the Minimum Revenue Indicator for account "22221111177-01DDA". Further assume that the account uses a CAA Role of a CAA Main Account and the BSC1/2/3/4 Billable Service Code is "12345678" for product "10".

Using sample values for Minimum Revenue Indicator, the Product Rules lookup in the next example stops at step 4 after finding the value "V".

| Step | Entity Name/Num | Product Code | Apply To Indic | PrdtRule Scope | Minimum Revenue Indicator |
|---|---|---|---|---|---|
| 1 | 22221111177-01DDA | 10 | ACNT | 12345678 | blank |
| 2 | 22221111177-01DDA | 10 | ACNT | * | blank |
| 3 | 22221111177-01DDA | 10 | ACNT | DFLT | blank |
| 4 | 22221111177-01DDA | 10 | CAA | 12345678 | V |
| 5 | 22221111177-01DDA | 10 | CAA | * | blank |
| 6 | 22221111177-01DDA | 10 | CAA | DFLT | A |

In the next example, the Product Rules lookup uses steps A1, A2, A3, A4, A5 and A6 but stops at step A4 after finding the value "V" for the CAA Subordinate Account. The Product Rules lookup then uses steps B1, B2, B3, B4, B5 and B6, then stops at step B2 after finding a different value of "A" for the CAA Main Account.

| Step | Entity Name/Num | Product Code | Apply To Indic | PrdtRule Scope | Minimum Revenue Indicator |
|---|---|---|---|---|---|
| A1 | 11111111111-01DDA | 10 | ACNT | 12345678 | blank |
| A2 | 11111111111-01DDA | 10 | ACNT | * | blank |
| A3 | 11111111111-01DDA | 10 | ACNT | DFLT | blank |
| B1 | 22221111177-01DDA | 10 | ACNT | 12345678 | blank |
| B2 | 22221111177-01DDA | 10 | ACNT | * | A |
| B3 | 22221111177-01DDA | 10 | ACNT | DFLT | blank |
| A/B4 | 22221111177-01DDA | 10 | CAA | 12345678 | V |
| A/B5 | 22221111177-01DDA | 10 | CAA | * | blank |
| A/B6 | 22221111177-01DDA | 10 | CAA | DFLT | A |

Derived Volume On is an optional field. The use of Derived Volume On attribute is dormant. Derived Volume has a value of blank or "Y" meaning derived volume is on.

Subscription Volume is an optional field. When pricing is to be performed, the data processing system uses the Product Rules to find the Subscription Volume. Subscription Volume contains a numeric value. The data processing system performs Product Rule lookups to find whether there is an applicable Subscription Volume. When Subscription Volume is not blank, PrdtRule Scope must be a BSC1/2/3/4 Billable Service Code and that BSC1/2/3/4 Billable Service Code must use a Service Role of "SUBS" on the Service Details screen.

The Product Rule lookups is as follows:

| Step | Entity Name/Num | Product Code | Apply To Indic | PrdtRule Scope | Subscription Volume |
|---|---|---|---|---|---|
| 1 | The account number | The product code | ACNT | The BSC1/2/3/4 Billable Service Code | ? |

"?" is Subscription Volume. Usually, the Subscription Volume number is "1" and is used in the [price*volume] calculation to determine revenue. For billing, Subscription Volume can be suppressed on the BILLFEED output if the BSC1/2/3/4 Billable Service Code's Suppress Feed Vol is "Y" on the Service Details screen. BILLFEED output is an LAW OFFICES OF output file produced by the data processing system which contains the complete details of what customers are to be billed. The Service Details screen is a screen provided as part of the data processing system which users use to define attributes of each Service code, including the BSC1/2/3/4 Billable Service Codes.

Billing Cycle and Run are optional fields. When billing is to be performed, the data processing system uses the Product Rules to find the Billing Cycle and Run applicable for each product. The data processing system performs Product Rule lookups to find the applicable Billing Cycle and Run.

The sequence and hierarchy of Product Rule lookups is as follows:

| Step | Entity Name/Num | Product Code | Apply To Indic | PrdtRule Scope | Billing Cycle | Run |
|---|---|---|---|---|---|---|
| 1 | The product code | The product code | PRDT | DFLT | ? | ? |
| 2 | PBB | PBB | PRDT | DFLT | ML | 1 |

Billing Cycle may contain a value of blank or "ML". "ML" means bill monthly. When Billing Cycle is blank, Run must also be blank. When both Billing Cycle and Run are blank, there is no Billing Cycle and Run applicable for this Product Rule and the data processing system continues to look.

Run has a value of blank or "1". "1" means billing run 1. Billing Cycle and Run are either both non-blank or both blank.

For the following example, assume the data processing system needs to find the Billing Cycle & Billing Run for product "10". The Product Rules lookup stops at step 2.

| Step | Entity Name/Num | Product Code | Apply To Indic | PrdtRule Scope | Billing Cycle | Run |
|---|---|---|---|---|---|---|
| 1 | 10 | 10 | PRDT | DFLT | blank | blank |
| 2 | PBB | PBB | PRDT | DFLT | ML | 1 |

One-Liner for Ac/BAC/Sv/Mk/Prd is a display only based on the values of Entity Name/Num and Apply to Indic. Ac/BAC/Sv/Mk/Prd is used to provide more information about the Entity Name/Num and the details are derived based on the values of Entity Name/Num and Apply To Indic. Therefore, users cannot change this item.

One-Liner for Price Table Dtl is a display only. This One-Liner displays selected attributes of the Price Table record. Price Table Dtl is used to provide more information about the applicable Price Table which is helpful when users are using complex Product Rules with the "AUTO" value. The details are derived based on the value of Price Tbl Name. Therefore, users cannot change this item.

One-Liner for Alternate Acnt is a display only. Alternate Acnt One-Liner displays selected attributes of the Alternate Account record and is used to provide more information about the applicable Alternate Account. The details are derived based on the value of Alternate Acnt. Therefore, users cannot change this item.

Some attribute fields cannot be updated because they contain information about the name of a Product Rule. To change these attribute fields, the user needs to delete the Product Rule, for example, by using SF8-Delete function key. The user then needs to make the necessary changes and insert the new Product Rule, for example, by using F8-Insert function key. For example, Entity Name/Num, Product Code, Apply to Indic and cannot be updated unless using the method described above.

Some fields cannot be updated because they are derived by the data processing system based on the name of the Product Rule. These fields are the One-Liner displays of the entities referred to by the Product Rule, such as Ac/BAC/Sv/Mk/Prd, Price Table Dtl and Alternate Acnt.

The data processing system may use software to store Product Rules which have been used during the session in its program memory area. This improves pricing and costing performance. However, when updating Product Rules, the change is not re-loaded into the program memory area for a time delay, which can be up to 60 seconds.

Before an update is committed to the database, the data processing system validates the Product Rule. The validation is the same as performed for an insert.

For pricing purposes, Price Tables are used. Product Rules interact with Price Tables to provide a comprehensive set of pricing combinations and to enable sophisticated exception pricing. A Product Rule can only refer to one Price Table. Product Rules which refer to a Price Table use that Price Table.

The Price Table can contain prices or costs, mutually exclusive, depending on the Schema of the Price Table. For example, a Schema of "COST" means that the Price Table contains only costs; a Schema of "STD" or "PRIC" means that the Price Table contains only prices; a Schema of "BNDL" means a Price Table for bundled pricing which contains prices to be used for the Pricing Method known as Cross CAA/Bundled Tiering.

Each Price Table containing prices is related to a Price Table containing costs. The mandatory field for Price Tables containing prices is blank for Price Tables containing costs. Cost Table field is the Entity Name of the Price Table containing costs. The price/cost contained within the Price Table may be a negative value. Price/cost Table Maintenance screen shows the prices and/or costs of a Price Table.

Each Price Table must nominate a Product. The Price Table applies only to BSC1/2/3/4 Billable Service Codes of that Product. The same Price Table name (Entity Name) can be used for different Products.

Exception price tables ("PRIC") can be created for an account, or a CAA (i.e., the main account of a grouping of accounts). Exception price tables are set up for accounts and CAA's to enable exception pricing to be performed for specific BSC1/2/3/4 Billable Service Codes of an account or across accounts within a CAA grouping of accounts. In order to enable exception pricing to be performed, the following Product Rule attributes are required: Auto Name, Apply To, Scope and Schema. In general, Price Tables contain the following attributes: Entity Name, Product, Apply To, Scope, Auto Name, Schema, Category, Description, Currency Code, Alias, Valid From Date, Minimum, No of Tiers, GoTo, Cost Table, Services List, Service, Description, Role, Amount, Price Method (Mth 1) & Apply To Group (Mth 2), Bundle Primary/Secondary (Bnd 1) & Bundle Character (Bnd 2), and Cat.

Entity Name is a mandatory field. When Auto Name is blank, the Price Table is a generic Price Table and Entity Name must be four characters. When Auto Name is "Y", the Price Table is an exception Price Table and the value of Entity Name is used to match with a record in Product Rules. If the Price Table is an exception Price Table, the Entity Name must have the value of an account, or a CAA (i.e., the main account of a grouping of accounts).

Product is a mandatory field. Product means a TMA Product Family. The Price Table applies to BSC1/2/3/4 Billable Service Codes of this Product only.

When a Price Table is to be created for a Product, Service Details screen may be used to confirm that BSC1/2/3/4 Billable Service Codes for this Product and Billing Category are operational as indicated by Record Status. If the Record Status is dormant and the user desires to make a service operational, the user needs to update the Record Status to active, Logoff and then Logon again.

Price Table attribute Apply To is blank for Generic Price Tables. For exception Price Tables, Apply To indicates whether an exception Price Table is applicable to an account or a CAA. In this case, Auto Name must be "Y" and Apply To value must be either "ACNT" for an account or "CAA" for a CAA (i.e., the main account of a grouping of accounts).

Scope indicates how Apply To is used and is used only for exception Price Tables. To use Scope, Auto Name must be "Y" and the values for Scope must be "DFLT", a BSC1/2/3/4 Billable Service Code, or "*". When Scope is not "DFLT" or "*", the content of Scope is treated as a BSC1/2/3/4 Billable Service Code.

The following table summarizes allowed values based on the content of Auto Name.

| Auto Name | Schema | Entity Name | Product | Apply To | Scope |
|---|---|---|---|---|---|
| Blank | "STD" | Must be 4 characters | Mandatory | Blank | Blank |
| Blank | "PRIC" | Must be 4 characters | Mandatory | Blank | Blank |
| Blank | "BNDL" | Must be 4 characters | Mandatory | Blank | Blank |
| Blank | "RBAT" | Must be 4 characters | Mandatory | Blank | Blank |
| Blank | "COST" | Must be 4 characters | Mandatory | Blank | Blank |
| "Y" | "PRIC" | An account number or a CAA account number | Mandatory | "ACNT" or "CAA" | A BSC1/2/3/4 Billable Service Code, or "*", or "DFLT" |

Category indicates which set(s) of BSC1/2/3/4 Billable Service Codes are applicable for the Price Table. When Amounts are recorded against BSC1/2/3/4 Billable Service Codes of a Billing Category, those Amounts will be retained on the database when Billing Category of a Price Table is updated to exclude them. Those Amounts are simply made dormant by the data processing system and can be made active by making that Billing Category active again. For example, when Billing Category is set to ALL and Amounts are entered against BSC2 Billable Service Codes. Billing Category is then changed to BSC1. Those Amounts entered against BSC2 Billable Service Codes are retained and can be made active again by changing Billing Category to "ALL", "BOTH" or "BSC2".

Price Table attribute Description is in free form text.

Price Table attribute Currency Code is a dormant field and may be activated if desired.

Price Table attribute Alias is another dormant field.

Valid From Date is an optional field in the form mmm yyyy, e.g., "January 1998". Valid From Date is used to create different sets of Amounts. Each set of Amounts is applicable from the Valid From Date until the next Valid From Date. The use of the Valid From Date field is important to billing, adjustment processing and what-if analysis queries.

When Valid From Date is blank, the Amounts are applicable as of "the dawn of time" until the next (if any) Valid From Date for that Price Table. Using "the dawn of time" enables "what-if" pricing and costing to be performed using historical Price Tables. When there is no next Valid From Date, the Amounts are applicable until "the end of time". Using "the end of time" enables "what-if" pricing and costing to be performed using Price Tables which will become effective at a future date. The data processing system contains screens which users use to perform pricing and costing online. The screens allow dates to be specified for the effective date of prices, the effective date of costs and the effective date of the BSC1/2/3/4 Billable Service Codes. These effective dates can be past, present or future or any combination. Hence the data processing system provides "what-if" pricing and costing.

Minimum is an optional field, used to define pricing tiers for tiered discounting and volume discounting. Each BSC1/2/3/4 Billable Service Code in each tier can use a different Amount. The use of Minimum is illustrated in the examples below.

| Tier | Minimum | BSC1/2/3/4 Billable Service Code | Included in this tier | Amount | Price Method (Mth 1) |
|---|---|---|---|---|---|
| 1 | 1 | 1234567 | Yes | 7.0000 | T |
| 2 | 15 | 1234567 | Yes | 7.5400 | T |
| 3 | 25 | 1234567 | Yes | 7.4000 | T |

In the above example, BSC1/2/3/4 Billable Service Code 1234567 uses three tiers. The first tier is effective for the first fourteen. The second tier is effective for the next ten. The third tier is effective for the remainder. Each tier in this example uses the same Price Method (Mth 1) of "T".

The first tier usually commences with Minimum value of "1". A first tier commencing with Minimum value of "0" is a special case and will be discussed later. There is a limit of 99 tiers. Another limitation is that the Price Method (Mth 1) for a BSC1/2/3/4 Billable Service Code must be the same for all tiers of that BSC1/2/3/4 Billable Service Code.

To change Minimum, the procedure is as follows: delete the record; change Minimum; and insert the record.

When a BSC1/2/3/4 Billable Service Code does not appear in any preceding tier, pricing for that BSC1/2/3/4 Billable Service Code will only commence when the quantity of that BSC1/2/3/4 Billable Service Code reaches the Minimum. The next example illustrates this point.

| Tier | Minimum | BSC1/2/3/4 Billable Service Code | Included in this tier | Amount | Price Method (Mth 1) |
|---|---|---|---|---|---|
| 1 | 1 | 1234567 | Skipped | None | None |
| 2 | 10 | 1234567 | Yes | 1.8000 | T |
| 3 | 20 | 1234567 | Yes | 0.0000 | T |
| 4 | 30 | 1234567 | Skipped | None | None |
| 5 | 40 | 1234567 | Yes | 1.6000 | T |

If the quantity of BSC1/2/3/4 Billable Service Code 1234567 is 120, the price is calculated as follows:

| Tier | Quantity | Tier Amount | Price calculated |
|---|---|---|---|
| 1 | 9 | None | None |
| 2 | 10 | 1.8000 | 19 * 1.8000 |
| 3 | 10 | 0.0000 | 10 * 0.0000 |
| 4 | 10 | 0.0000 | 10 * 0.0000 |
| 5 | 81 | 1.6000 | 1.6000 * 81 |

Each method can be further qualified by up to three other indicators (each a single character). The additional indicators are ApplyToGroup, Primary/SecondaryFlag and BundleChar. Following are some rules that apply to any given price unit record:

| Minimum | Pricing Methods Allowed (Mth 1) | Apply To Grp (Mth 2) | Primary/ Secondary (Bnd 1) | Bundle Character (Bnd 2) |
|---|---|---|---|---|
| 0 | M | n/a | P, S, * or blank | 0-9, A-Z or blank |
| 1 | All except M | Y, N or blank (=Y) | n/a | n/a |
| >1 | T, V, $ or L | Y, N or blank (=Y) | n/a | n/a |

Different Pricing Methods against the same service at different Minimums (not counting Minimum of zero) is not allowed. All higher Minimums must match the Pricing Method for a service at Minimum of 1. Other limitations include: only one Primary per Bundle Character; Secondaries must be Price Method of "M"; Secondaries must be zero price; each+service can have a different markup; bundling is only allowed for Pricing Method of "M"; and if Pricing Method "F" is used on a service, Minimum must be "1" and no other entry can exist for that service, regardless of Minimum or Pricing Method.

No of Tiers is a display only field.

GoTo is an optional field. By entering a value, the user can use the SpgDn-GoTo function key to display BSC1/2/3/4 Billable Service Codes starting with the nearest matching BSC1/2/3/4 Billable Service Code at the top of the list of BSC1/2/3/4 Billable Service Codes. Other values for GoTo attribute are "TOP" to display the first page of the BSC1/2/3/4 Billable Service Codes list; spaces to display the first page of the BSC1/2/3/4 Billable Service Codes list; "BOT" to display the last page of the BSC1/2/3/4 Billable Service Codes list; and "zzzzzzzz" to display the last page of the BSC1/2/3/4 Billable Service Codes list.

Services List is a list of BSC1/2/3/4 Billable Service Codes. For each item, the following fields are shown: Service, Service Description, Role, Amount, Price Method (Mth 1) & Apply To Group (Mth 2), Bundle Primary/Secondary (Bnd 1) & Bundle Character (Bnd 2), and Cat.

Service shows the BSC1/2/3/4 Billable Service Code as shown on the Service Details screen. Description is Description as shown on the Service Details screen. Role is Service Role as shown on the Service Details screen. Role can have the following value: BAL (Balance), BICA(Actual Basic Item), BICD (Derived Basic Item), BICS (Special Derived Basic Item), COST(Cost Only), DOSS (Daylight Overdraft), DRCT(Direct Expense Allocation), FLOT (Float), MIS (MIS Information), MTRV (Minimum Revenue (x-services)), NA (None (FSC & TSC)), NORM (Normal Service), REJ % (% Rejects), RFR$ (Rebate $ Basis), RFR % (Rebate % Basis), RFT (Rebate % Total Revenue), SERV (Inter Office Allocation), SUBS (Subscription), THSH (Threshold Revenue), TP-$ (Totally Priced,) TP-% (Totally Priced (mark-up), TP-C (Totally Priced (collected)), TP-D (Totally Priced (deduct fee)), TP-M (Totally Priced (MIS deduct fee)), TP-R (Totally Priced (referral deduct fee)), or TP-U (Totally Priced (uncollected)).

Amount is a price or cost amount and is shown as 14 digits plus 4 decimal places. When an Amount is entered, Price Method (Mth 1) must also be entered.

Amount is treated as a "hard zero amount", meaning the Amount is priced as zero when Amount is blank or "0" and Price Method (Mth 1) is "V" or "T" or Price Method (Mth 1) is "U" and Scope is "*".

Following is a sample Price Table and contains the following data:

| Tier | Minimum | BSC1/2/3/4 Billable Service Code | Included in this tier | Amount | Price Method (Mth 1) |
|---|---|---|---|---|---|
| 1 | 1 | 1234567 | Skipped | None | None |
| 2 | 10 | 1234567 | Yes | 1.8000 | T |
| 3 | 20 | 1234567 | Yes | 0.0000 | T |
| 4 | 30 | 1234567 | Skipped | None | None |
| 5 | 40 | 1234567 | Yes | 1.6000 | T |

If the quantity of BSC1/2/3/4 Billable Service Code 1234567 totals 120, the price is calculated as follows:

| Tier | Quantity | Tier Amount | Price calculated |
|---|---|---|---|
| 1 | 9 | None | None |
| 2 | 10 | 1.8000 | 10 * 1.8000 |
| 3 | 10 | 0.0000 | 10 * 0.0000 |
| 4 | 10 | 0.0000 | 10 * 0.0000 |
| 5 | 81 | 1.6000 | 81 * 1.6000 |

There are 2 Mth fields in Price Table attribute Price Method (Mth 1) & Apply To Group (Mth 2): Price Method (Mth 1) is a pricing method applicable to the BSC1/2/3/4 Billable Service Code and Apply To Group (Mth 2) is a pricing method bundling indicator which describes how the quantity of a BSC1/2/3/4 Billable Service Code is to be totaled across a grouping of accounts.

For a Price Method (Mth 1) value of "%" and Description of TP-% (markup of TP), transaction analysis calculates a special value for this BSC1/2/3/4 Billable Service Code and records the special value in the Account Activity record. Pricing then uses this special value in the following manner: for prices, the price will be the special value as a percentage multiplied by the Amount field in the Price Table; and for costs, the cost will be the special value. Price Method (Mth 1) Value can also be "+" meaning Cost Plus (% markup), "F" meaning Flat Fee, "M" meaning Minimum Revenue, "X" meaning Maximum Revenue, "T" meaning Tiering, "U" meaning Unit Price, or "V" meaning Volume Discount.

For an Apply To Group (Mth 2) Value of "Y", this method applies to group and the Price Method (Mth 1) Value must be "T", "U" or "V". The quantity for this BSC1/2/3/4 Billable Service Code is totaled as a single bundle across all accounts in the group. The total of the bundle is then used for pricing of this BSC1/2/3/4 Billable Service Code for the entire group of accounts. Hence, volume discounting is performed on the group of accounts collectively.

For an Apply To Group (Mth 2) Value of blank, this method applies to group and the Price Method (Mth 1) Value can be any. The quantity for this BSC1/2/3/4 Billable Service Code is totaled as a single bundle across all accounts in the group. The total of the bundle is then used for pricing of this BSC1/2/3/4 Billable Service Code for the entire group of accounts. Hence, volume discounting is performed on the group of accounts collectively.

For an Apply To Group (Mth 2) Value of "N", this method does not apply to group and the Price Method (Mth 1) Value must be "T", "U" or "V". Each "N" BSC1/2/3/4 Billable Service Code is priced as a single bundle for each account in the group. Hence, volume discounting is performed on each account separately There are 2 Bnd fields in Price Table attribute Bundle Primary/Secondary (Bndl): Bundle Primary/Secondary (Bnd 1) which is a minimum revenue indicator and Bundle Character (Bnd 2) which is a minimum revenue bundling indicator.

For a Bundle Primary/Secondary (Bnd 1) Value of blank, bundling for minimum revenue is not applicable for this BSC1/2/3/4 Billable Service Code.

For a Bundle Primary/Secondary (Bnd 1) Value of "*", Bnd 1 applies to all BSC1/2/3/4 Billable Service Codes. There can be only one BSC1/2/3/4 Billable Service Code in a Price Table Category which uses "*". The pricing result for all BSC1/2/3/4 Billable Service Codes in the Price Table which are not "P" and which are not "S" are totaled into a single bundle. The bundle is then used to compare with the Minimum "0" tier Amount for this BSC1/2/3/4 Billable Service Code. When the bundle is less than the minimum, the pricing result is increased to match the Amount.

For a Bundle Primary/Secondary (Bnd 1) Value of "P", bundling only applies to the primaries in the bundle. There can be only one "P" BSC1/2/3/4 Billable Service Code for a Bundle Character (Bnd 2) bundle. The quantities for this BSC1/2/3/4 Billable Service Code are bundled together with its secondary BSC1/2/3/4 Billable Service Codes. Bundle Character (Bnd 2) is used to match secondary BSC1/2/3/4 Billable Service Codes and their primary BSC1/2/3/4 Billable Service Code into a bundle. The total for bundle is then used to compare with the Minimum "0" tier Amount for this "P" BSC1/2/3/4 Billable Service Code. When the bundled total is less than the Minimum "0" tier Amount, the pricing result is increased to match the Minimum "0" tier Amount.

For a Bundle Primary/Secondary (Bnd 1) Value of "S", bundling only applies to the secondaries in the bundle. The quantity for this "S" BSC1/2/3/4 Billable Service Code and all other "S" BSC1/2/3/4 Billable Service Codes in a bundle are added to the primary's bundle.

For a Bundle Character (Bnd 2) Value of blank, Bundle Primary/Secondary (Bnd 1) Value must be blank or "*". For a Bundle Character (Bnd 2) Value of "0"-"9" and "A"-"Z", Bundle Primary/Secondary (Bnd 1) Value must be "P" or "S".

Cat is as Category shown on the Service Details screen.

Before an update is committed to the database, the data processing system validates the Price Table. The validation is the same as performed for an insert. In order to perform the update the user must first have read the price table.

When the user has entered all required fields and price values for all required BSC1/2/3/4 Billable Service Codes, regardless of how many "Pages" of BSC1/2/3/4 Billable Service Codes are being used or paged between, the full set of prices for that Valid From Date are inserted. Before an insert is committed to the database, the data processing system validates the Price Table.

When deleting the set of prices for the current Price Table, current Valid From Date and current Min Trans Count and if no more prices exist (i.e., for another Valid From Date or Min Trans Count), the Pricing Table name and description are also deleted and the data processing system loses all record of that Price Table.

AppyToGroup can be set to "N" so that volume discounting can be placed on a Market Segment's Price Table, but the CAA volume is not be grouped for the tiering/threshold determination. Blank is equivalent to "Y".

CostPlus (+) can only be used in a Price Table containing prices (i.e. not in a Price Table containing costs.

Each service within a price table which nominates an Amount is required to have a pricing method. Hence, each price table can have a mixture of pricing methods contained within it. The pricing methods available "out of the box" are: F (Flat Fee), U (UnitPrice or Cost), V (Volume Discount), T (Tiering), +(CostPlus %), M (MinRev), X (MaxRev) and % (TP-% markup of total price).

Each pricing method can be qualified by up to four single character indicators: Pricing Method which is shown on the Price Table screen as Mth (Mth 1), Apply To Group which is shown on the Price Table screen as Mth (Mth 2), Primary/Secondary Flag which is shown on the Price Table screen as Bnd (Bnd 1), and Bundle Character shown on the Price Table screen as Bnd (Bnd 2).

Special groupings can be defined for accounts which causes Cross CAA Bundled Tiering to be used.

Following is a price table with sample prices:

| Service Code | Price Method | Apply To Group | Bundling Prim/Sec | Bndl. Char. | Minimum | Unit-Price |
|---|---|---|---|---|---|---|
| DDDDDDDD | + | N/A | | | 1 | 20.00% |
| EEEEEEEE | + | N/A | | | 1 | 15.00% |

In the above example, the price for service DDDDDDDD is 120.00% of the cost for that service multiplied by its volume. The price for service EEEEEEEE is 115.00% of the cost for that service multiplied by its volume.

Each "+" service can have a different markup. The cost is recorded in the price table's related cost table.

Following is a price table with sample prices:

| Service Code | Price Method | Apply To Group | Bundling Prim/Sec | Bndl Char. | Minimum | MinRev or UnitPrice |
|---|---|---|---|---|---|---|
| 55555555 | F | N | | | 1 | $100.00 |

Flat Fee is charged if Volume is greater than zero. In this example, A Flat Fee of $100.00 is charged for service 55555555 if its volume is greater than zero.

When ApplyToGroup is "Y" or space and the price applies to a CAA (whether via standard or exception pricing), the Flat Fee is apportioned across the group.

Minimum Revenue can be used regardless of service volume or only if there is service volume. Minimum Revenue cannot apply to a CAA or group of accounts. Maximum Revenue (MaxRev) is an opposite to Minimum Revenue (MinRev), i.e., Maximum Revenue defines the maximum which can be charged.

Following are sample prices for a price table:

| Service Code | Price Method | Apply To Group | Bundling Prim/Sec | Bndl. Char. | Minimum | MinRev or UnitPrice |
|---|---|---|---|---|---|---|
| 11111111 | M | | | | 0 | $50.00 |
| 22222222 | M | | P | A | 0 | $25.00 |
| 33333333 | M | | S | A | [0] | [0] |
| 44444444 | M | | S | A | [0] | [0] |

Here, Services 22222222, 33333333 and 44444444 are bundled together (by Bndl.Char.) in their minimum revenue determination. The primary (Bundling Prim/Sec="P") in the bundle, 22222222, is marked up to satisfy any shortfall in Minimum Revenue.

Following is a Product Rule:

| Product | Entity Identifier | Apply To Scope | Price tbl | AltAc Flag | Altrnt Acnt | MinRev |
|---|---|---|---|---|---|---|
| 35 | 123456789012-01DDA | ACNT | | DFLT | AUTO | A |

MinRev cannot apply to a CAA or group of accounts.

If the Bundling Primary/Secondary Flag="*" and Price Table's Pricing Method="M", then the minimum revenue is compared to the total revenue across all services used by the account/group.

Following is an example showing the effect of different Pricing Methods:

| Service Code | Price Method | Apply To Group | Bundling Prim/Sec | Bndl. Char. | Minimum | Unit-Price |
|---|---|---|---|---|---|---|
| 77777777 | T | N | | | 1 | $10.00 |
| | | | | | 100 | $8.00 |
| | | | | | 250 | $6.50 |
| 88888888 | T | N | | | 1 | $7.00 |
| | | | | | 50 | $6.00 |
| | | | | | 100 | $5.00 |
| 99999999 | U | N | | | 1 | $8.00 |

-continued

| Service Code | Price Method | Apply To Group | Bundling Prim/Sec | Bndl. Char. | Minimum | Unit-Price |
|---|---|---|---|---|---|---|
| AAAAAAAA | U | N | | | 1 | $8.00 |
| 11223344 | T | N | | | 1 | $5.00 |
| | | | | | 35 | $6.00 |
| 22334455 | U | N | | | 1 | $8.00 |
| BBBBBBBB | V | Y | | | 1 | $10.00 |
| | | | | | 100 | $8.00 |

Services 77777777, 88888888 and 11223344 all use Tiering. For service 77777777, the first 99 of its volume for the account is priced at $10.00 per unit; volume 100 to 249 is priced at $8.00 per unit, and volume 250 and above is priced at $6.50 per unit. For Service 88888888, the first 49 of its volume for the account is priced at $7.00 per unit; volume 50 to 99 is priced at $6.00 per unit; and volume 100 and above is priced at $5.00 per unit. For service 11223344, the first 34 of its volume for the account is priced at $5.00 per unit and volume 35 and above is priced at $6.00 per unit.

Services 99999999, AAAAAAAA and 22334455 use UnitPrice or Cost. All volume is priced at $8.00 per unit for these services.

Service BBBBBBBB uses volume discount. For service BBBBBBBB, if its combined volume for the group of accounts (note, "apply to group"=Y) exceeds 99, all its volume is priced at $8.00 per unit (all its activities because method is "V", being volume discount instead of tiered). Otherwise, all its volume is priced at $10.00 per unit.

Special groupings can be defined for account+service combinations which causes Cross CAA Bundled Tiering to be used. A Product Rule is required for each of the accounts to be included in the Cross CAA Bundled Tiering. Each account is defined as an Entity Name/Num. Apply To is "ACNT". Scope is the service. Price Tbl Name is the same for all the special group. Special Group is "Y".

Following are sample Product Rules:

| Product | Entity Name/Num | Apply To | Scope | Price Tbl Name | SpclGrp |
|---|---|---|---|---|---|
| 35 | 111111111111-01DDA | ACNT | 11111111 | JLB1 | Y |
| 35 | 111111111111-01DDA | ACNT | 22222222 | JLB1 | Y |
| 35 | 222222222222-01DDA | ACNT | 11111111 | JLB1 | Y |

Price table JLB1 would be set up as Schema "BNDL" as follows:

| Service Code | Price Method | Apply To Group | Bundling Prim/Sec | Bndl. Char. | Minimum | Unit Price |
|---|---|---|---|---|---|---|
| 11111111 | T | | | | 1 | $1.00 |
| | T | | | | 21 | $0.90 |
| | T | | | | 31 | $0.80 |
| 22222222 | T | | | | 1 | $1.00 |
| | T | | | | 21 | $0.90 |
| | T | | | | 31 | $0.80 |

Each different service in the bundle must have entries with identical prices, methods, and at all tiers. The above Price Method could just as easily be a "V", if Volume Discount were to be used instead of Tiered.

Following are sample service volumes:

| CAA | Account Number | Service | Volume |
|---|---|---|---|
| A | 111111111111-01DDA | 1111111 | 10 |
| | | 2222222 | 5 |
| B | 222222222222-01DDA | 1111111 | 21 |

Following are applicable tiered discount prices:

| Tier | Service | Minimum | Price |
|---|---|---|---|
| 1 | 1111111 bundled with 2222222 | 1 | 1.00 |
| 2 | | 21 | 0.90 |
| 3 | | 31 | 0.80 |

Total Volume for services 1111111 and 2222222=10+5+21=36

Following are sample calculations for Tiering:

| Total Revenue = | [TIER 1] | 20 × 1.00 = | 20.00 |
|---|---|---|---|
| | [TIER 2] | 10 × 0.90 = | 9.00 |
| | [TIER 3] | 6 × 0.80 = | 4.80 |
| | | total = | 33.80 |

Following is a sample apportioning:

| CAA | DDA | SERVICE | VOL | CALCULATION | REVENUE | TOTAL |
|---|---|---|---|---|---|---|
| A | 1 | 11111111 | 10 | 33.80 × 10/36 | 9.39 | |
| | | 22222222 | 5 | 33.80 × 5/36 | 4.69 | |
| B | 2 | 11111111 | 21 | 33.80 × 21/36 | 19.72 | |
| | | | | | | 33.80 |

For account+service combinations, the bundled prices need to be apportioned back to the accounts. This requires knowledge of the bundled volumes, by service across the accounts in each bundle. The data processing system obtains this information in 2 steps. The first step is performed by the Activity Load and the second step is performed by the Pre Billing Bundler.

Billing would process each account+service in the activity table individually, using the same formula each time: Apportioned Rev=[Total Group Rev based on GroupVol & TierVol]×BillVol/GrpVol. Note that the GroupVol is only used by pricing if the Product Rule's Special Group "Y".

The various embodiments of the methods and structures of this invention that are described above are illustrative only of the principles of this invention and are not intended to limit the scope of the invention to the particular embodiments described. In view of this disclosure, those skilled-in-the-art can define other product rules, price tables and billing methods, and use these alternative features to create a method, circuit, or system according to the principles of this invention.

I claim:

1. In a data processing system, a method for pricing financial transactions, said method comprising:
   creating, in a database system of the data processing system, a plurality of price tables;
   creating, in the database system, a plurality of product rules each applicable to one or more of said financial transactions, wherein each of said product rules comprise a plurality of attributes, including mandatory and optional attributes, wherein said mandatory attributes specify (a) one or more entities to which said product rule pertains and (b) a scope of said product rule, wherein one of the optional attributes allows specifying one of said price tables, and wherein a search key is constructed for each product rule from one or more of said mandatory attributes; and
   for each one of said financial transactions:
      identifying an applicable one of said product rules for said transaction based on said mandatory attributes; and
      pricing said transaction according to the price table linked to said identified applicable product rule.

2. The method of claim 1, wherein said price table specifies a billing method.

3. The method of claim 1, wherein said attributes comprises:
   a name of said product rule;
   a status of said product rule;
   pricing and billing information; and
   display only information.

4. The method of claim 1, wherein each of said product rules is linked to one of said price tables by a price table name.

5. The method of claim 1, wherein an entry in each of said price tables specifies a pricing method.

6. The method of claim 5, wherein said pricing method is flat fee.

7. The method of claim 5, wherein said pricing method is unit price.

8. The method of claim 5, wherein said pricing method is unit cost.

9. The method of claim 5, wherein said pricing method is volume discount.

10. The method of claim 5, wherein said pricing method is tiering.

11. The method of claim 5, wherein said pricing method is cost plus.

12. The method of claim 5, wherein said pricing method is minimum revenue.

13. The method of claim 5, wherein said pricing method is maximum revenue.

14. The method of claim 5, wherein said pricing method is markup of total price.

15. The method of claim 5, wherein said pricing method is bundled pricing.

16. The method of claim 5, wherein said pricing method is bundled pricing across a group of accounts.

17. The method of claim 1, wherein one of said mandatory attributes includes an identifier for said product rule.

18. The method of claim 1, further comprising, in creating one of said product rules, applying a validating rule to validate said product rules prior to committing said product rules to said database system.

19. The method of claim 1, wherein said product rules comprise a default product rule.

20. The method of claim 1, wherein said price table contains prices.

21. The method of claim 1, wherein said price table contains costs.

22. The method of claim 1, wherein said price table contains negative values.

23. A data processing system for pricing a financial transaction, said data processing system comprising:
   means for creating one or more price tables in the data processing system;
   means for creating one or more product rules in the data processing system applicable to said financial transaction, each of said product rules comprises a plurality of mandatory attributes and a plurality of optional attributes, wherein said mandatory attributes specify (a) one or more entities to which said product rule pertains and (b) a scope of said product rule, wherein one of the optional attributes allows specifying one of said price tables;
   means for creating a search key for each product rule, said search key being constructed from one or more of said mandatory attributes;
   means for identifying an applicable one of said product rules for said transaction based on said mandatory attributes; and
   means for calculating a price for said financial transaction using said identified product rule and accessing said price table specified in said product rule.

24. The data processing system of claim 23, further comprising means for billing.

25. The data processing system of claim 23, wherein means for creating a product rule comprises:
   means for assigning a name to said product rule;
   means for assigning a status to a product rule;
   means for associating with said product rule pricing and billing information; and
   means for associating said product rule with display only information.

26. The data processing system of claim 23, further comprising means for creating an identifier for said product rule using said mandatory attributes.

27. The data processing system of claim 26, further comprising means for looking up said optional attributes using said identifier.

28. The data processing system of claim 23, further comprising means for applying validation rule to validate said product rules before committing said product rule to a database.

29. The data processing system of claim 23, further comprising means for creating a default product rule.

* * * * *